Nov. 11, 1958  F. G. STEELE  2,860,294
DIGITAL POSITION SERVO SYSTEMS
Filed May 22, 1956  3 Sheets-Sheet 1

INVENTOR:
Floyd G. Steele
By Seymour M. Greenberg
His Attorney

Nov. 11, 1958 F. G. STEELE 2,860,294
DIGITAL POSITION SERVO SYSTEMS
Filed May 22, 1956 3 Sheets-Sheet 2

INVENTOR:
Floyd G. Steele
By Seymour M. Rosenberg
His Attorney

INVENTOR:
Floyd G. Steele
His Attorney

United States Patent Office 2,860,294
Patented Nov. 11, 1958

2,860,294

DIGITAL POSITION SERVO SYSTEMS

Floyd G. Steele, La Jolla, Calif., assignor to Digital Control Systems, Inc., La Jolla, Calif.

Application May 22, 1956, Serial No. 586,586

23 Claims. (Cl. 318—28)

This invention relates to digital position servo systems, and more particularly to difunction positional servo systems which are operative in response to one or more applied input difunction signal trains, representative of a position, for driving a positionable element to the position represented by the input train.

As herein utilized the term difunction signal train refers to a train of periodic signals each having either a first value representative of a first number or a second value representative of a second number, and is readily distinguished from signal trains conventional in prior art digital systems in that all of the signals in the difunction signal train which have the same value represent identical numbers. For example, if it is assumed that the difunction signal train is normalized, or in other words, that the numbers represented by the signals in the train represent two numbers of equal amplitude but opposite signs such as either a plus one or a minus one, then each of the signals in the train represents either a plus one or a minus one, the average value of the signals in the train representing the quantity to which the train corresponds. Accordingly, a difunction signal train may be termed a non-numerical representation of the quantity which the train represents, since the signals are not weighted according to any number system, or in other words, have no radix as this term is customarily employed.

Difunction signal trains may take numerous forms, the most common of which are a bilevel electrical signal train in which either a high level voltage or low level voltage is presented during each signal period, a train of bipolar electrical pulses in which one pulse is presented during each signal period, or a train of unipolar pulses in which the occurrence of a pulse during a signal period represents one of the algebraic numbers representable by the signals in the train and the absence of a pulse during a signal period represents the other algebraic number which is representable.

In representing a variable quantity as a difunction signal train, successive signals are generated in a manner such that their average corresponds to the magnitude and polarity of the quantity. For example, if the quantity to be represented is a position or a rate which is presently at ½ its full scale value in the positive direction, its representation would be a continuous train of difunction signals wherein a pattern such as $+1$, $-1$, $+1$, $+1$ is continuously repeated. Over four intervals the average of these signals is equal to $$\frac{+3-1}{4} = +\frac{1}{2}$$

or the magnitude and polarity of the input quantity. If now the quantity to be represented is varied in a negative direction and stabilizes at ⅓ its full scale value in the negative direction, its representation would become a continuous train of difunction signals wherein a pattern such as $-1$, $+1$, $-1$ is continuously repeated, the average of the train then being equal to $$\frac{+1-2}{3} = -\frac{1}{3}$$

or the magnitude and polarity of the input quantity. In a similar manner it may be shown that for any given magnitude and polarity of the input variable quantity a difunction train may be generated wherein the average of the individual signals in the train over $n$ signal periods represents the variable quantity within the limits of $$\pm\frac{2}{n}$$

A more rigorous mathematical and physical description of difunction signal trains and the manner in which they may represent a variable quantity is given in copending U. S. patent application Serial No. 510,673, filed on May 24, 1955, for "Difunction Computing Elements" by the same inventor.

Heretofore the representation of physical or mathematical quantities by difunction signal trains has been found to be extremely useful both in the solution of mathematical functions and in the field of automatic control. In this latter field in particular several different forms of difunction rate servo systems have been conceived, as disclosed in U. S. Patents 2,729,773 for "Di-function Non-Linear Servo System" both by the present inventor, and in copending U. S. patent application Serial No. 525,148, filed on July 29, 1955, for a "Bidirectional Digital Rate Servo System," also by the present inventor.

Each of the foregoing systems includes a movable element which is driven by an associated electromechanical transducer either at a rate, or to a position, represented by an input forcing function, and a difunction quantizer or rate generator which is connected in a feedback loop to the servo system input for communicating thereto the status of the movable elements.

Although the foregoing systems perform satisfactorily in response to difunction rate input signals and binary number inputs, there has remained a need for positional servos which will respond to an input difunction command signal representative of a position rather than a rate, and which are not dependent for their operation upon an integrating circuit for providing precise positional follow-up.

The present invention fills the foregoing void in the art by providing a whole class of digital position servos which are operative in response to an applied input command signal representative of a position for moving a positionable element to a null position corresponding to the value represented by the command signal. According to the basic concept of the invention, the positional servos herein disclosed include a positionable element, a transducer responsive to an applied difunction control signal for driving or braking the positionable element in a sense and at a rate represented by the polarity and magnitude of the quantity represented by the train, and means responsive to the input command signal and the position of the positionable element for applying to the transducer a difunction control signal train which is representative of the positional error between the positionable element and the desired position as represented by the command signal.

According to one of the basic embodiments of the invention to be hereinafter shown and described, a difunction position signal, representative of the actual position of the positionable element, is generated and applied to a signal combining circuit, which may be a difunction subtractor for example, wherein it is subtracted from a difunction command signal train representative of the position to which the positionable element is to be driven. The difference difunction train thus generated corresponds to the positional error of the servo and is applied to the transducer to provide proportional control thereof.

According to other embodiments of the invention, the basic system described above is modified by the inclusion of means for differentiating and/or integrating the positional error signal to provide either proportional plus derivative control, proportional plus integral control or both derivative and integral control simultaneously. In still other embodiments of the invention, on the other hand, there are disclosed structures for obtaining both error control and derivative of error control through simultaneous use of both position representing difunction signal trains and difunction signal trains representing the time rate of change of position of the positionable element.

In all of the various embodiments of the invention precise positional follow-up is provided without requiring the integration of rate signals; consequently, a temporary loss of input information, or an error therein, causes no more than a momentary instability after which the system again nulls properly without a permanent error.

It is therefore an object of the invention to provide a digital position servo system wherein a positionable element is drivable toward a null position represented by an applied input signal train.

It is another object of the invention to provide digital position servos which generates a difunction control signal representative of the positional error between an associated positionable element and the position represented by an applied command signal, the control signal being employed to provide proportional control of a transducer utilized to drive the positionable element in a restoring direction.

It is a further object of the invention to provide digital position servos wherein a positionable element is driven to a position represented by an applied difunction command signal train.

Still another object of the invention is to provide proportional control of digital position servos by generating a difunction position signal train representative of the position of a positionable element, combining the position signal train with a difunction command signal train, representative of the position to which the element is to be driven, to generate a difunction error signal train representative of the positional error, and driving the positionable element in a sense and at a rate proportional to the sense and magnitude of the error represented by the error signal train.

A further object of the invention is to provide digital position servos wherein both proportional control and derivative control are employed to drive a positionable element to a position represented by an applied difunction command signal train.

Another object of the invention is to provide digital position servos wherein both proportional control and integral control are employed to drive a positionable element to a position represented by an applied difunction command signal train.

It is also an object of the invention to provide digital position servos wherein proportional control, derivative control and integral control are employed to drive a positionable element to a position represented by an applied difunction command signal train.

An additional object of the invention is to provide digital position servos wherein both positional intelligence and rate intelligence are employed to position a positionable element at a null position represented by an applied difunction command signal train.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
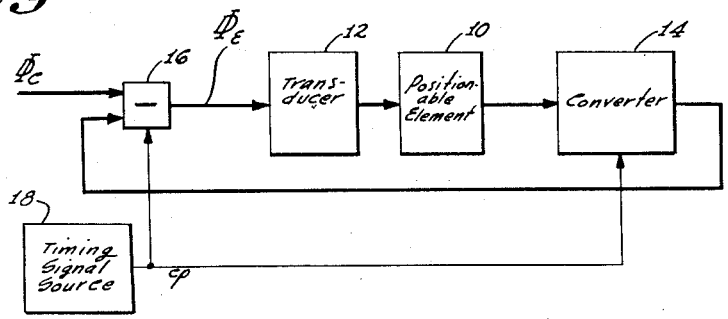
Fig. 1 is a block diagram of the basic digital position servo system of the invention.
Figure 9:
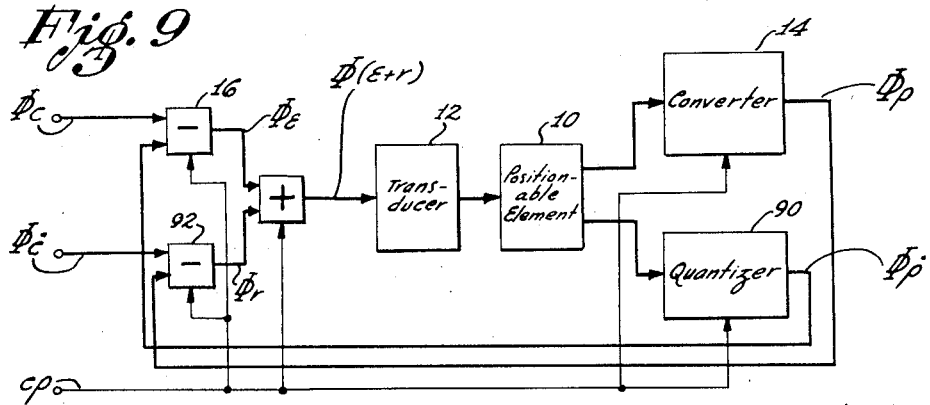
Figure 10:
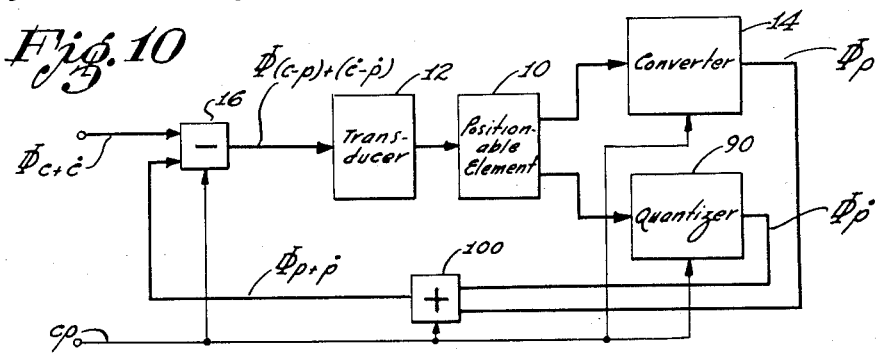
Figure 11:
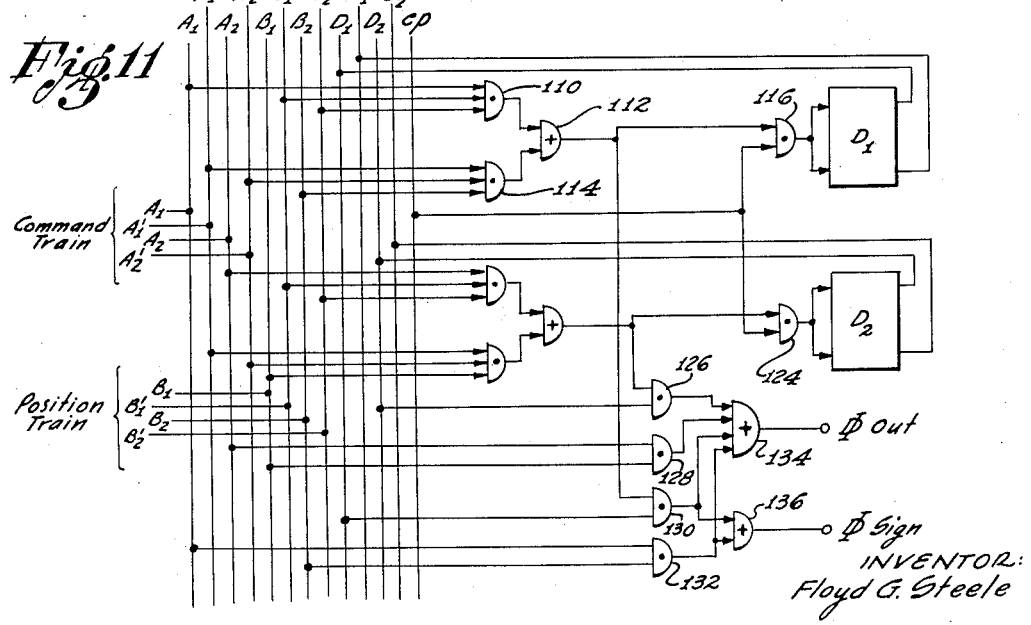

Figs. 9 and 10 are block diagrams of modified forms of positional servo systems, in accordance with the invention, wherein derivative control is provided by operating on a difunction rate signal train representative of the position of the positionable element; and Fig. 11 is a schematic diagram of one form of signal combining circuit which may be used in the positional servo of Fig. 1 to provide operation thereof with trifunction signals.

With reference now to the drawings, wherein like or corresponding parts are designed by the same reference characters throughout the several views, there is shown in Fig. 1 a difunction position servo system, according to the invention, which is utilized for driving a positionable element 10 to a predetermined position corresponding to the position represented by an applied difunction command signal train $\mathcal{D}_c$. Basically the servo system comprises, in addition to the positionable element, an electromechanical transducer 12 for driving or positioning the positionable element, an analog-to-difunction converter 14 coupled to the positionable element and responsive to its position for generating a difunction signal train $\mathcal{D}_p$ representative of the position of element 10, and a signal combining circuit 16 for receiving the difunction command signal train $\mathcal{D}_c$ and the difunction signal train $\mathcal{D}_p$ to apply to electromechanical transducer 12 a difunction error signal train $\mathcal{D}_e$ representative of the error between the desired position and the actual position of the positionable element, the transducer responding to the error signal train to drive the positionable element toward the desired position.

The symbol $\mathcal{D}$, as set forth hereinabove, represents a capital D having an / overwritten and is used hereinafter as a designation of a difunction signal train—with any following subscript being used as a designation of the quantity represented by the difunction signal train. Thus, for example $\mathcal{D}_p$ is that difunction signal train which represents the position $p$ of the positionable element.

In addition to the foregoing elements the positional servo of the invention further includes a timing signal source 18 which produces a train of periodically recurring clock pulses $c_p$; this signal is used to synchronize the operation of the entire system, and is applied to converter 14, to combining circuit 16, and in addition, to the input instrument or mechanism, not shown, which is employed to generate difunction command signal train $D_c$. It will be recognized by those skilled in the computer art that timing signal source 18 may embody any of several well known structures for generating clock pulses, such as a magnetic drum having a timing track thereon, a free running multivibrator, or a conventional stabilized sine-wave oscillator with an associated overdriven amplifier and differentiating circuit.

Figure 2:
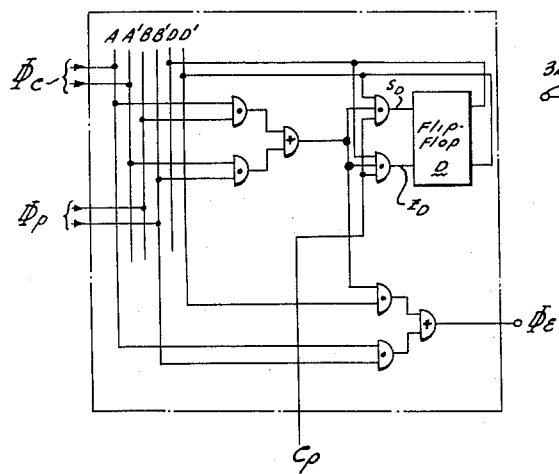
Fig. 2 is a schematic diagram of one form of signal combining circuit which may be used in the positional servo systems of the invention for performing arithmetic operations on difunction signal trains.

Before proceeding with the detailed description of operation of the difunction positional servo shown in Fig. 1, consideration will first be given to the structure of the various elements incorporated therein. With reference now to Fig. 2, there is shown one form which signal combining circuit 16 may take for generating the difunction error signal train $D_e$, this specific circuit being more precisely termed a difunction subtractor circuit and being operative to produce a difunction output signal representative of the difference between the quantities represented by the difunction command signal train $D_c$ and the difunction position signal train $D_p$. Stated in elementary terms, the difunction subtractor in subtracting difunction signal trains $D_p$ and $D_c$ functions in accordance with the following table:

Table I

| $D_c$ Minuend | $D_p$ Subtrahend | Result | $D_e$ Positional Error Difunction Representation |
|---|---|---|---|
| +1 | −1 | +2 | +1 |
| −1 | +1 | −2 | −1 |
| +1 | +1 | 0 | Any two successive zeroes represented as an alternate (+1) and (1). |
| −1 | −1 | 0 | |

It will be noted that when the result is a +2 or a −2, the difunction output signal train from the difunction subtractor preferably represents the instantaneous result with a maximum of either a +1 or a −1, respectively. In addition it will be noted that, rather than represent zero directly, the output signal train represents each two successive zeroes as alternate +1 and −1, which results in a net difference of zero in accordance with the general principles of difunction representation. Accordingly it will be recognized that the output difunction signal train generated may be expressed as:

$$D_e = \frac{D_c - D_p}{2} \qquad (1)$$

Referring now with particularity to the circuit of Fig. 2, the difunction subtractor therein illustrated receives two pairs of complementary signals A, A' and B, B' respectively representative of the difunction input signal trains $D_c$ and $D_p$, and includes a bistable storage element, such as a flip-flop D, and a plurality of logical "and" and "or" gates which are utilized for controlling the conduction state of the flip-flop and for generating output difunction signal train $D_e$ representing the difference or error. For purposes of description it will be assumed that signals A and B correspond directly to difunction signal trains $D_c$ and $D_p$, and that signals A' and B' are the inverse or complemetary functions of trains $D_c$ and $D_p$, the complementary signals A' and B' being provided to simplify the logical gating networks of the difunction subtractor. It will further be assumed that for the embodiment of the subtractor shown in Fig. 2, each high level signal in difunction error train $D_e$ is representative of a plus one and is operative to energize the electromechanical transducer in one direction or sense, as will be described hereinafter, whereas a low level voltage signal is representative of a minus one output signal and is operative to energize the transducer in the opposite sense.

Before continuing further with the description of the invention, consideration will be given to the designation of the input and output conductors of flip-flop D. The flip-flop includes a pair of input conductors which are designated the S input conductor and Z input conductor respectively, each input conductor being further designated by the alphabetical subscript D corresponding to the alphabetical designation of the flip-flop. In addition the flip-flop includes a pair of output conductors one of which is designated by the same alphabetical designation as the flip-flop while the other is designated by the prime of the alphabetical designation of the flip-flop. Thus flip-flop D has both $S_D$ and $Z_D$ input conductors and D and D' output conductors.

In operation flip-flop D will be assumed to be responsive to the application of an input signal to its S input conductor for setting to a conduction state corresponding to the binary value one or the difunction value of +1, and to the application of an input signal to its Z input conductor for setting to the opposite conduction state, which corresponds to the binary value zero or the difunction value of −1. In addition it will be assumed that when the flip-flop is in its +1 representing state the voltage presented on its corresponding designated output conductor has a relatively high level value while the voltage presented on its prime output conductor has a relatively low level value. Conversely, when the flip-flop is in its −1 representing state the voltage presented on its correspondingly designated output conductor has a relatively low level value whereas the voltage presented on its prime output conductor has a relatively high level value.

Each "and" and "or" gate is represented in the drawings by a semi-circular hood, each "and" gate having a dot (.) in the center thereof, while each logical "or" gate includes a plus sign (+) in its center. The "and" and "or" gates may utilize either vacuum tubes or crystal rectifiers, and are preferably similar structurally to the gating circuits illustrated in the article entitled "How an Electronic Brain Works," by Berkeley and Jensen, found on page 45 of the September 1951 issue of Radio-Electronics magazine. Briefly stated, each "and" gate includes two or more input terminals and a single output terminal and is responsive to the voltage levels of two-level signals applied to its input terminals for producing a high level voltage output signal at its output terminal only when all of the input signals are at their high level values. Each "or" gate, on the other hand, includes two or more input terminals and a single output terminal and is responsive to the voltage levels of two-level signals applied to its input terminals for producing a high-level output signal at its output terminal whenever one or more of the input signals is at its high level value.

It will be recalled from Table I set forth hereinabove that the difunction output signal $D_e$ is actually equal to $$\frac{D_c - D_p}{2}$$

owing to the fact that the actual difference between the difunction signals is either +2, 0, or −2 whereas only a +1 or a −1 may be represented by the output difunction signal. It will also be recalled that successive zeroes resulting from the subtraction operation are represented by alternate (+1)'s and (−1)'s; as will be more clearly understood from the description of operation set forth hereinbelow, flip-flop D functions as a one bit memory for indicating whether the last zero was represented as a plus one or a minus one, or in other words, to insure that successive zeroes are represented by an alternate plus one and minus one.

The mechanization of the logical gating network employed in the difunction subtractor may be expressed by the following Boolean algebraic equations:

$$S_D = (A.B + A'.B')D'.cp \quad (2)$$

$$Z_D = (A.B + A'.B')D.cp \quad (3)$$

$$\mathbb{D}_e = [A.B' + (A.B + A'B').D'] \quad (4)$$

wherein the signal $(cp)$ represents the periodically recurring clock pulse or timing signal received from the clock pulse source in Fig. 1.

Consider now the significance of Equations 2 through 4 and the manner in which their mechanization satisfies the conditions tabulated in Table I. Equation 2 signifies set flip-flop D to its one-representing state whenever a clock pulse $(cp)$ is received "and" the flip-flop is in its zero-representing state $(D')$ "and" the input difunction signals are either both plus ones $(A.B)$ "or" both minus ones $(A'.B')$. Conversely, Equation 3 signifies set flip-flop D to its zero-representing state whenever a clock pulse $(cp)$ is received "and" the flip-flop is in its one-representing state $(D)$ "and" both input difunction signals are either both plus ones $(A.B)$ "or" both minus ones $(A'.B')$. In other words, Equations 2 and 3, when taken together signify that the conduction state of flip-flop D is reversed each time the two input difunction signal trains are the same during a particular digit time interval.

Equation 4, on the other hand, signifies that an output difunction signal of plus one should be generated whenever the minuend difunction signal $\mathbb{D}_c$ is a plus one and the subtrahend difunction signal $\mathbb{D}_p$ is a minus one $(A.B')$, or whenever there is a zero difference between the input difunction signals $(A.B+A'.B')$ and the last zero difference was represented as a minus one $(D')$. At all other times, namely, whenever the minuend difunction signal $\mathbb{D}_c$ is a minus one and the subtrahend difunction signal $\mathbb{D}_p$ is a plus one, or whenever there is a zero difference between the input difunction signals and the last zero difference was represented by a plus one, the difunction error signal will be at its low level value representing a minus one.

It is apparent, therefore, that the difunction subtractor functions to produce a plus one difunction output signal when the difference between the input difunction signals is $(+1)-(-1)=+2$, a minus one difunction output signal when the difference between the input difunction signals is $(-1)-(+1)=-2$, and alternate plus ones and minus ones during successive intervals when the difference between the input difunction signals is zero. Accordingly it will be recognized that the particular difunction subtractor circuit shown in Fig. 2 produces an output difunction signal train which corresponds to one-half the actual difference between the input difunction signal trains. However, since the polarity of the fraction represented by the difunction output signal train always corresponds to the polarity of actual difference between the difunction input trains, and furthermore, since the polarity of the fraction represented by the output signal from the difunction subtractor is sufficient to servo the counter control circuit in the proper direction, it is clear that for the purpose of the present invention it may be stated that the difunction output signal from the difunction subtractor represents the difference between the applied input difunction signals.

Figure 3:
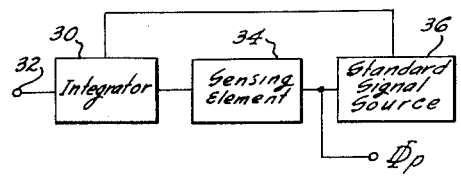
Fig. 3 is a block diagram of one of several known forms of analog-to-digital converters which may be employed in the positional servo system of the invention.

It should also be pointed out that although the circuit of Fig. 2 is termed a difunction subtractor circuit, it is structurally identical with what is known as a difunction adder circuit, the only distinction between the use of the circuit as a subtractor or as an adder being in the points at which signals B and B' are applied. More specifically, if the points to which signals B and B' are applied were to be reversed, the circuit of Fig. 2 would be operative to add together the input difunction signal trains $\mathbb{D}_c$ and $\mathbb{D}_p$. Inasmuch as the complementary signals B and B' which constitute the difunction signal $\mathbb{D}_p$ from the converter are clearly taken from predetermined points within the converter, it is obvious that a reversal of the B and B' signal conductors both in the quantizer and in the circuit of Fig. 3 would enable the difunction rate servo of the invention to operate with a difunction adder circuit in lieu of a difunction subtractor circuit. Accordingly, it is to be expressly understood that the use of the term "difunction subtractor circuit," both in the specification and in the appended claims, is intended to encompass all such equivalent structures and especially those where a change in terminology merely implies a double reversal of a pair of conductors without any change whatsoever in the basic mode of operation.

Before proceeding further with the description of the component circuits of the basic positional servo of the invention, it should be pointed out, and emphasized that signal combing circuit 16, as well as the other system circuits to be hereinafter described, may also utilize and generate signal trains which are termed "trifunction" signals, the term trifunction implying that intelligence is conveyed as plus one, minus one or zero representing signals by means of two simultaneously appearing signal trains, at least one of which is a difunction train.

More particularly, one trifunction technique for conveying intelligence uses two non-normalized difunction trains, one of which is capable of representing either plus one or zero during each signal period, while the other is capable of representing either minus one or zero. In this form of trifunction a positive quantity will ordinarily be represented by the average of the plus one and zero train, whereas negative quantities will ordinarily be represented by the average of the minus one and zero train. Still another trifunction technique employs only one difunction train representing with each signal either a one or a zero so that the average of the train corresponds to the magnitude of the quantity being represented. In this scheme the sign of the quantity is conveyed by a simultaneously occurring sign signal train which has either of two values representing either plus or minus, the sign of a one representing signal appearing in the difunction train being determined by the simultaneously occurring sign signal in the sign signal train.

It will be recognized by those skilled in the art, therefore, that if trifunction signal trains are to be used in the servo systems of the invention, at least one and possibly two difunction trains will be used to represent the intelligence information. Consequently, it should be expressly understood that as herein utilized the term difunction signal train is generic to both difunction representation and trifunction representation.

Consider now the structure and function of analog-to-difunction converter 14, shown in Fig. 1, for generating difunction signal train $\mathbb{D}_p$ representative of the position of the servo system's positionable element. The converter may embody any one of several different concepts, and is preferably structurally similar to the converter disclosed in copending U. S. patent application Serial No. 540,699, filed on October 17, 1955, for "Analog-to-Difunction Converter," by Siegfried Hansen, a block diagram of this form of converter being disclosed in Fig. 3. Briefly stated this type of converter includes an integrator 30 for integrating an analog signal applied at an input terminal 32, a sensing element 34 responsive to the magnitude of the integral for generating a plus one difunction output signal whenever the integral exceeds a predetermined reference level at the end of a difunction period and a minus one difunction output signal whenever the integral is negative with respect to the reference level at the end of a period, and a standard signal source 36 which is responsive to each plus one difunction signal generated for applying to integrator 30 a standard signal to reduce the integral by a predetermined amount. Accordingly, the average value of the difunction signal train generated corresponds to the rate at which the integral of the applied analog signal is changing, and hence corresponds to the ratio of the amplitude of the applied analog signal to the full scale value which the converter is capable of representing.

It should be expressly understood that still other conversion mechanisms may be employed to generate the difunction position train $\mathbb{D}_p$, as for example a converter of the type disclosed in copending U. S. patent application Serial No. 510,673, filed May 24, 1955, for "Ordered Time Interval Computing Systems," or of the type disclosed in copending U. S. patent application Serial No. 588,078, filed May 29, 1956, "Input Conversion Methods and Apparatus," both by the same inventor. According to the first of these applications, an analog signal is converted first to a variable time interval and then to a corresponding difunction signal train, whereas in the latter application a variable frequency representing an analog quantity is converted to a corresponding difunction signal train.

As will appear hereinbelow, the positionable element of the system may include an appropriate signal generator for generating an analog signal which the associated converter can accept for conversion to a difunction signal train. For example, the converter shown in Fig. 3 and the converter disclosed in the aforementioned U. S. patent application 510,673 may operate in conjunction with a multiturn potentiometer mechanically coupled to the servo system's positionable element. The converter disclosed in U. S. patent application Serial No. 588,078 preferably operates in conjunction with a variable frequency oscillator mechanically coupled to the positionable element of the servo system and operable to generate an output signal whose frequency corresponds to the position of the positionable element.

Figure 4A:
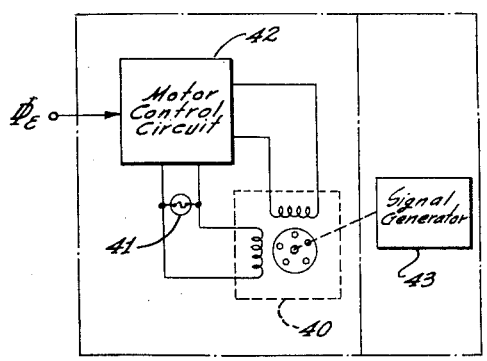
Figs. 4a and 4b are diagrammatic views, partly in schematic form, of two different types of transducers and positionable elements which may be utilized in the servo systems herein disclosed.
Figure 4B:
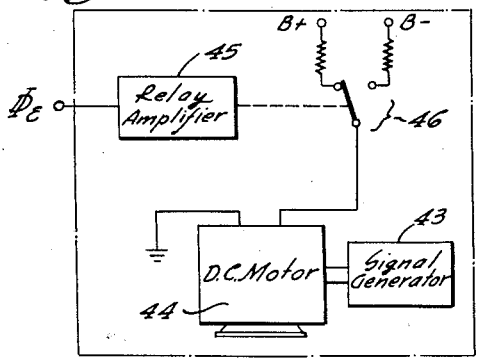

It will be recognized by those skilled in the servo art that the positionable element and its associated driving transducer may comprise any of numerous structures, such as an electric motor, a linear actuator, a magnetic clutch or other electromechanical devices. With reference now to Figs. 4a and 4b there are shown two different structures, each including an electric motor, which may be employed as a combined electromechanical transducer and positionable element. Referring now with particularity to Fig. 4a, the transducer embodiment here shown includes a two phase motor 40 one winding of which is connected across an alternating current source 41, the other winding of the motor being selectively energizable, under the control of an associated motor control circuit 42, by either the signal from source 41 or by the same signal shifted 180° in phase. The motor control circuit, on the other hand, receives the difunction error signal train $\mathbb{D}_e$ and is operative in response to the individual signals therein to energize the motor in a predetermined direction in response to each plus one difunction signal in the train, and in the opposite direction in response to each minus one signal in the train.

The associated motor shaft in this instance constitutes the positionable element of the system, and is coupled either directly or through a gear box to a signal generator 43 which is employed, as heretofore explained, to develop an electrical analog signal representative of shaft position upon which the associated analog-to-difunction converter may operate to generate the difunction position signal train $\mathbb{D}_p$. It will be recognized, of course, that it is immaterial whether signal generator 43 is considered as part of the positionable element or as part of the analog-to-difunction converter.

The alternate structural form shown in Fig. 4b includes a D. C. motor 44 whose energization is again controlled by the individual signals in the applied difunction error signal train $\mathbb{D}_e$, the control function here being provided by a relay amplifier 45 which functions to selectively apply either a relatively high level voltage or a relatively low lever voltage to the motor through a set of single-pole double-throw contacts generally designated 46. In operation for example, the relay amplifier responds to each plus one difunction signal in the applied error train to apply a positive voltage to the motor, and to each minus one difunction signal in the applied error train to apply a negative voltage to the motor. If this form of transducer is employed in the servo system of the invention, the motor shaft, here designated 47, constitutes the positionable element and is coupled to a signal generator 43 which in turn generates the input signal to the associated analog-to-difunction converter.

Having thus described in detail the various elements which may be employed in the positional servo system of the invention, consider now the operation of the system in response to the applied difunction command signal train. For purposes of description it will be assumed that the system has been previously stabilized at a null position, or in other words that the position of the positionable element corresponds to the position represented by the difunction command signal train, and that a step function change then occurs in the command signal train.

Prior to the application of the step function change the repetitive pattern of the signals in the difunction position signal train $\mathbb{D}_p$ will be the same as that of the signals in the difunction command signal train owing to the fact that the positionable element is in the proper position corresponding to the position represented by the command function. Accordingly, the difunction error signal train generated by signal combining circuit 16 will have a net valuation of zero since it will contain an equal number of plus ones and minus ones. Consequently, the transducer will exert a net torque of zero on the positionable element and the system will remain at its null position. It should be pointed out that this will be true even if the repetitive pattern in the command and position difunction signals are displaced in phase with respect to each other.

When the step-function change occurs in the command signal, however, the difunction pattern in the command signal train will change to represent a quantity which is either positive or negative with respect to the quantity previously represented, depending upon whether the change in the function is positive or negative, respectively. Accordingly, signal combining circuit 16 will thereafter generate a difunction error signal train representative of the difference between the quantities represented by the command and position difunction signal trains. It is clear, therefore, that a net torque will be exerted on the positionable element to drive it toward a new null position, the movement of the positionable element resulting, in turn, in a change in the quantity represented by the difunction position signal train so that the error represented by difunction error signal train $\mathbb{D}_e$ will also be reduced toward zero. It will thus be recognized that the basic servo system shown in Fig. 1 provides proportional control.

It will also be recognized that the transient response of the servo system, and in particular the damping to which it is subjected, will be determined by a number of factors including the inertia of the positionable element and its load, the torque exertable by the associated transducer, and the frequency response of the transducer as it relates to the clock pulse frequency, or stated differently, the frequency at which individual difunction signals are applied to the motor. It is apparent, therefore, that the proportional control positional servo shown in Fig. 1 may be critically damped, overdamped or underdamped, as desired, by properly controlling the foregoing parameters. It should be here noted that mechanical damping mechanisms well known to the servo art may also be employed in cooperation with the positionable element to control the transient response of the servo system shown in Fig. 1, as well as to control the response of the more complex systems to be described hereinafter.

It should be emphasized that the digital servo system of Fig. 1, as well as the other systems yet to be described, provides precise positional follow-up and will recover from a temporary loss of or error in the command information without leaving a positional error. More specifically, in the digital rate servos of the prior art wherein the command signal represents a rate, positional follow-up can be provided only by integrating the input signal; consequently, a temporary error, or a loss of input information, creates a permanent error in the integral and hence in the follow-up. The systems of the present invention, on the other hand, would merely exhibit a momentary instability if the command signal were to be temporarily inaccurate, and will recover completely with precise positional follow-up as soon as the difunction command signal train again correctly represents the input positional forcing function.

Figure 5:
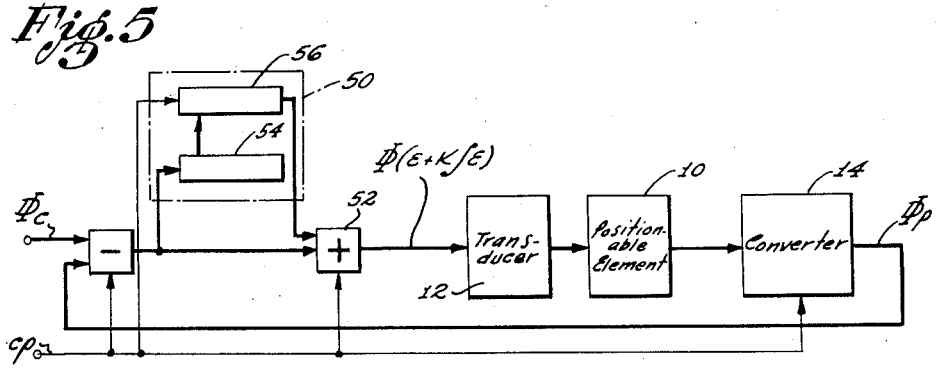
Fig. 5 is a block diagram of a digital position servo system illustrating the application of integral control to the system of Fig. 1.

Having thus disclosed the basic positional difunction servo concept of the invention, consideration will now be given to the various modifications which may be made therein to provide, in addition to error control, either derivative-of-error control, integral-of-error control, or both. Referring now with particularity to Fig. 5, there is shown a positional servo, according to the invention, which provides both error control and integral-of-error or lag control, the system again including a transducer 12, positionable element 10, analog-to-difunction converter 14, and a signal combining circuit 16 each of which elements function in the same manner as previously described.

In addition to the foregoing elements, the positional servo of Fig. 5 also includes a digital integrator 50 which receives the difunction error signal train $D_e$ and functions to produce an output difunction error signal train $$D_{k\int e}$$

and a second signal combining circuit 52 which functions to additively combine the error signal train and the integral-of-error signal train to produce a difunction control signal train $$D_{(e+k\int e)}$$

including both positional error and integral-of-error control intelligence for guiding the transducer energization. Thus the steady state errors which may occur in a general feedback controller are minimized by the integral control which function in effect as an equalizer in increasing low frequency response.

It should be noted that digital integrator 50 may comprise either of several different structures known to the art. Firstly, it could comprise a simple count-up count-down binary accumulator with the difunction error signal being applied to its least significant digit stage, an integrator of this type being disclosed with more particularity in the aforementioned copending U. S. patent application Serial No. 525,148. On the other hand, as shown in Fig. 5, the integrator may include a digital differential analyzer type integrator having two registers 54 and 56, the lower register operating as a count-up count-down counter which accumulates the difunction signals in the error signal train, the contents of the lower register being additively transferred to the upper register once per difunction interval so that the overflow bits resulting from successive additions represents the integral of error difunction signal train $$D_{k\int e}$$

A rigorous description of both the structure and mode of operation of this form of digital integrator is given in copending U. S. patent application Serial No. 388,780, filed on October 28, 1953, for "Electronic Digital Differential Analyzer," by the present inventor. It should be noted here that the constant factor $k$ in the integral-of-error difunction signal train is a scaling factor which may be controlled by properly selecting the stage in the count-up count-down register to which the difunction error train is applied, and thereby provides a method for controlling the gain of the integral control used in the system.

Signal combining circuit 52 in Fig. 5 may comprise a difunction adder, in which instance it may be structurally identical with the difunction subtractor previously described in connection with Fig. 2. Referring again briefly to Fig. 2, it will be recalled that if signals B' and B respectively represent the difunction signal to be operated upon and its complement, instead of vice versa as described for the subtractor circuit, then the identical circuit will function instead as a difunction adder, the result produced being given by the following equation:

$$D_{(e+k\int e)} = \frac{D_e + D_{k\int e}}{2} \tag{5}$$

Figure 6:
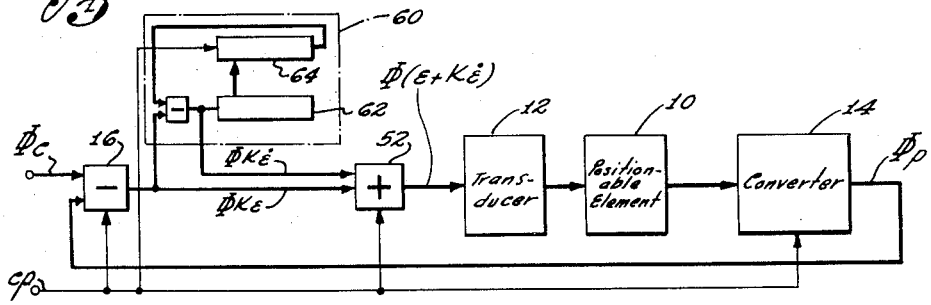
Fig. 6 is a block diagram of a digital position servo system illustrating one manner in which derivative control may be employed in the system of Fig. 1.

The basic difunction positional servo of the invention may also be modified to provide error plus derivative-of-error control, or in other words now to Fig. 6, for example, there is shown a difunction positional servo system which is substantially identical with the servo system of Fig. 5 with the exception that integrator 50 in Fig. 5 is replaced in Fig. 6 with a differentiator 60, the differentiator functioning to generate a difunction derivative-of-error signal train $D_{k\dot{e}}$ which is employed to provide lead control.

The particular form of the differentiator shown in Fig. 6 is somewhat analogous to the integrator of Fig. 5 in that it also includes two registers 62 and 64 which correspond to registers 54 and 56 in Fig. 5 and which per se function in the identical manner. However, differentiator 60 further includes a substractor circuit 66 which functions to subtract the overflow difunction signal train generated by register 64 from the difunction error signal train $D_e$ and to generate an output difunction train which is applied to the count-up count-down register 62.

It may be shown that the operation of registers 62 and 64, together with the feedback loop including subtractor circuit 66, function to settle in register 62 a binary number representative of the error quantity non-numerically represented by the difunction error signal train $D_e$. Since this number is derived from operation upon a predetermined number of preceding difunction signals in the difunction error train, the difunction overflow train which results from additive transfers into register 64 may be termed $D_{e_{old}}$, since it relies upon that portion of the past history of the error train which operates to produce the number in register 62. The difunction error train presently received from signal combining circuit 16, on the other hand, represents the latest intelligence on the positional error magnitude, and may be conveniently termed $D_{e_{new}}$. Accordingly, the output difunction train $D_{\dot{e}}$ from difunction subtractor circuit 66 represents the rate of change of the error train with respect to time, or in other words, is a first order approximation of the derivative of the error signal train $D_e$. A more complete description of the operation of differentiator 60 is given in the aforementioned copending U. S. patent application Serial No. 510,673, filed on May 24, 1955, for "Difunction Computing Elements" by the present inventor, the difunction differentiator of Fig. 6 constituting an integral part of the difunction multipliers disclosed in the referenced application.

In operation the use of a lead term in the digital controller functions to materially decrease the system time constants and hence to increase the frequency response of the system, or stated differently, tends to make the inertia of the positionable element appear smaller which results in a faster response to variations in the command signal intelligence. It will be appreciated, of course, that the decision whether or not to use derivative control in a particular application must be made in view of the system parameters previously considered and in view of he maximum rate at which the difunction command signal intelligence is capable of changing.

Figure 7:
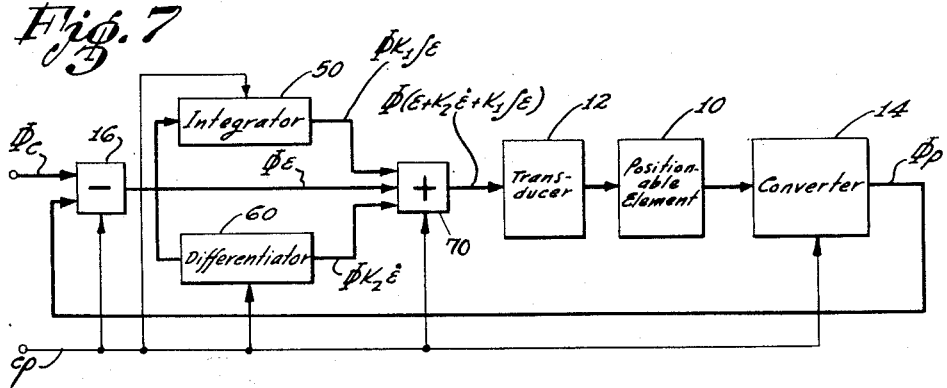
Fig. 7 is a block diagram of a digital position servo, in accordance with the invention, which provides both derivative and integral control as well as proportional control.

Having thus described the application of both derivative control and integral control to the difunction positional servo, it should be apparent that both forms of control may be combined with the basic servo system of Fig. 1 to provide a difunction lead-lag servo. Referring now to Fig. 7, there is shown such a servo system, according to the invention, which includes both a digital integrator 50 and a digital differentiator 60, each of these elements receiving the difunction error signal train $\mathbb{D}_e$ produced by signal combining circuit 16.

As shown in Fig. 7, the output signal trains from integrator 50 and differentiator 60 are respectively designated $$\mathbb{D}_{k_1\!\int e} \text{ and } \mathbb{D}_{k_2\dot{e}}$$

the constants $k_1$ and $k_2$ designating the gain factor which is respectively introduced by the scaling selected within the integrator and differentiator. These two signal trains, together with the difunction error signal train $\mathbb{D}_e$ are applied to a common signal-combining circuit 70 which functions to produce an output difunction control signal train $$\mathbb{D}_{(e+k_1\!\int e+k_2\dot{e})}$$

which provides to the transducer proportional control, integral control and derivative control simultaneously.

It will be noted that signal combining circuit 70 must be capable of summing three input trains rather than two, as in the difunction adders and subtractors previously described. This may be accomplished in several manners, as for example by first adding two of the three applied difunction trains with a first difunction adder to generate a first sum signal train, and then adding the remaining input train with the first sum train in a second difunction adder to produce the control signal train. If this is done the gain factors $k_1$ and $k_2$ in the derivative and integral control signal trains can be preselected to provide the proper weighting of the signals in the control signal train.

Figure 8:
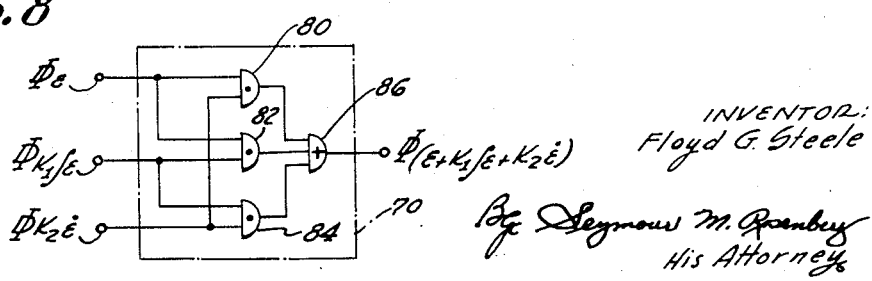
Fig. 8 is a schematic diagram of an alternate form of signal combining circuit which may be employed in the system of Fig. 7 to perform an approximate arithmetic operation on three applied control signal trains.

Still another structure which may be used as circuit 70 for generating a control signal train is a single gating matrix, such as that shown in Fig. 8, which generates a plus one difunction output signal when any two or more of the three applied difunction trains simultaneously present difunction signals representing plus one. It will be recognized that an advantage of this structure is that no flip-flops are used in the generation of the output signal. The mechanization of this particular combining circuit requires three two-terminal "and" gates 80, 82 and 84 whose outputs are connected to a common three-terminal "or" gate 86.

In operation the use of both integral control and derivative control provides both low frequency sensitivity and high frequency sensitivity, thereby increasing the system bandwidth. It will be understood by those skilled in the servo art that for any particular systems application the gain of the integral and derivative terms should be preselected to provide the desired transfer function or response.

In all of the embodiments of the invention heretofore described it has been assumed that all of the input intelligence is conveyed to the servo system in a single difunction command signal train $\mathbb{D}_c$. It should be understood, however, that the basic positional servo of the invention, as shown in Fig. 1, may also be employed in conjunction with a dual input command presentation wherein two difunction command signal trains are applied to the servo, one of the command signals being representative of position and the other being representative of the rate of change of the position represented by the position command signal.

Referring now to Fig. 9, there is shown a modified positional servo system, in accordance with the invention, which again includes a converter 14 and signal combining circuit 16 for providing proportional or error control in the same manner as disclosed with respect to Fig. 1, and in addition, a difunction quantizer 90 and a second signal combining circuit 92 for providing rate control by generating a difunction rate signal train $\mathbb{D}_r$ representative of the difference between the rate at which the difunction command signal is changing its representation of position and the rate at which the positionable element is changing position.

The difunction quantizer 90 may be identical with the difunction quantizer shown and described in copending U. S. patent application Serial No. 311,609, filed September 26, 1952, for "Computer and Indicator System," by the present inventor. Briefly stated, the quantizer is operative to generate a zero-representing difunction signal train composed of alternate plus ones and minus ones whenever the positionable element of the servo system is stationary, and is operative to interrupt this sequence with an additional plus one or minus one signal whenever the positionable element is respectively moved in either one direction or the other through a predetermined incremental distance. Thus for example if the servo system positionable element is a motor shaft, and an additional plus one is generated for each 10° of clockwise rotation and an additional minus one is generated for each 10° of counterclockwise rotation, then a clockwise rotational rate of 1 R. P. S. will operate to produce 36 more plus ones than minus ones in difunction signal train $\mathbb{D}_p$ during each one second interval, whereas a counterclockwise rotational rate of 1 R. P. S. will operate to produce 36 more minus ones than plus ones in the output signal train during each one second interval.

In operation, signal combining circuit 16 functions to produce a difunction error signal train $\mathbb{D}_e$ in the manner previously described, while circuit 92 produces a difunction rate signal $\mathbb{D}_r$ corresponding to the difference between the rate at which the command position signal is changing, as represented by command signal train $\mathbb{D}_{\dot{c}}$, and the rate at which the servo's positionable element is changing position, as represented by the output train $\mathbb{D}_p$ from the quantizer. Thus the servo system of Fig. 9 in essence provides proportional control and derivative control in a manner similar to the previously disclosed system of Fig. 6, the principal distinction between these systems being that the system of Fig. 9 requires no differentiating mechanism, but employs instead an additional command signal representing the rate of change of the applied position intelligence information. It is clear, therefore that for the system of Fig. 9 the input instrument or mechanism, not shown, which supplies the position command signal train $\mathbb{D}_c$ should include an additional element for simultaneously generating the position rate of change command signal train $\mathbb{D}_{\dot{c}}$.

It should be pointed out that in systems of this type which utilize both proportional and rate control, the positional and rate information derived from the positionable element may be conveyed by a single difunction signal train which is then combined with the difunction command signal train to produce a resultant positional control signal train having rate "lead" components therein which act to speed up the response of the positionable element. For example there is shown in Fig. 10, a difunction positional servo system according to the invention in which the difunction position signal train $\mathbb{D}_p$ and the difunction rate signal train $\mathbb{D}_{\dot{p}}$ are combined in a difunction adder 100 to produce a single difunction signal train $\mathbb{D}_{p+\dot{p}}$ representing the position and the rate of change of position of the positionable element, the signal train $\mathbb{D}_{p+\dot{p}}$ being then combined with the difunction command signal (appropriately scaled) in the difunction subtractor 16 to produce a resultant difunction control signal train which has both positional and rate components. As shown in Fig. 10 the difunction command signal is designated as $D_{c+\dot{c}}$ indicating that it represents a desired position and also include a component representing a desired rate of change of the desired position. The error signal train $D_{(c-p)+(\dot{c}-\dot{p})}$ produced by subtractor 16, therefore not only represents the positional error of element 10 but also includes a rate component representing the derivative of the position error of the positionable element, this component acting to greatly speed up the overall system response.

It will also be recognized that when the desired position represented by the difunction command signal is expected to change relatively slowly (so that $\dot{c}$ is usually very small) then adequate response characteristics can still be obtained even though the $\dot{c}$ component is eliminated from the command signal train. In such a mode of operation the applied command signal would be designated simply as $D_c$ and the resultant control signal train produced by subtractor 16 in response to application of $D_c$ and $D_{p+\dot{p}}$ would be a control signal train $D_{c-(p+\dot{p})}$, this control signal train having a somewhat similar effect in speeding up system response.

It will be recalled that the basic digital position servo of Fig. 1 and the modifications thereof as herein disclosed are also applicable to operation with trifunction input signals. If this is desired, of course, the command signal should be presented as a trifunction signal, and the converter coupled to the positionable element must generate a position-representing trifunction signal. One converter suitable for this purpose is disclosed in Fig. 9 of the aforementioned U. S. patent application Serial No. 588,078, for "Input Conversion Method and Apparatus," by the same inventor.

It is clear, of course, that if the servo system is to accept trifunction input signals, then signal combining circuit 16 must also be capable of operation on trifunction signals. With reference now to Fig. 11 there is shown a trifunction subtractor circuit which operates in accordance with the following table:

*Table II*

| Minuend Trifunction Value | Subtrahend Trifunction Value | Actual Result | Trifunction Output Value |
|---|---|---|---|
| +1 | −1 | +2 | +1 |
| −1 | +1 | −2 | −1 |
| +1 | +1 | 0 | 0 |
| −1 | −1 | 0 | 0 |
| 0 | 0 | 0 | 0 |
| +1 | 0 | +1 | +1 {Write any two successive plus ones as a zero and a plus one |
| 0 | −1 | +1 | +1 |
| −1 | 0 | −1 | −1 {Write any two successive minus ones as a zero and a minus one |
| 0 | +1 | −1 | −1 |

Before describing the operation of the subtractor of Fig. 1, it should first be pointed out that for purposes of illustration it will be assumed that each of the trifunction command and position input signals to the trifunction subtractor is composed of two difunction signal trains respectively representative of plus one and zero, and minus one and zero. Thus for example the command signal is represented in Fig. 11 by a signal $A_1$ and its complement $A_1'$ representative of the plus one-zero difunction train and by a signal $A_2$ and its complement $A_2'$ representative of the minus one-zero difunction train. A similar notation is also employed in representing the position trifunction, the input signals $B_1$, $B_1'$, $B_2$, $B_2'$ corresponding in significance to the similarly designated signals in the command signal train. The following table correlates the voltages presented by the signals in each of the trifunction input trains with the representation of the three trifunction values of plus one, zero, and minus one.

*Table III*

| Value Represented | Plus One-Zero Difunction | | Minus One-Zero Difunction | |
|---|---|---|---|---|
| | Signal $A_1$ | Comp. Signal $A_1'$ | Signal $A_2$ | Comp. Signal $A_2'$ |
| +1 | High | Low | Low | High. |
| 0 | Low | High | Low | High. |
| −1 | Low | High | High | Low. |

In order to illustrate another form of trifunction representation, it will be assumed that the output trifunction generated by the trifunction subtractor circuit of Fig. 11 is composed of an output difunction $D_{out}$ whose high and low level output signals respectively represent either one or zero, and a simultaneously appearing difunction sign train $D_S$ whose high and low level signals respectively representing plus and minus ones, the signals in this latter train being utilized to indicate the sign of each one-representing signal appearing in the output difunction train $D_{out}$.

Referring back to Table II, the following equations define the logical conditions set forth in the table, and in addition, represent in logical algebra the mechanization of the logical gating circuits of Fig. 11.

$$S_{D1}=Z_{D1}=(A_1B_1'B_2'+A_1'A_2'B_2).cp \quad (6)$$
$$S_{D2}=Z_{D2}=(A_2B_1'B_2'+A_1'A_2'B_1).cp \quad (7)$$
$$D_{out}=A_1.B_2+A_2.B_1+(A_1B_1'B_2'+A_1'A_2'B_2)D_1+ (A_2B_1'B_2'+A_1'A_2'B_1)D_2 \quad (8)$$
$$D_{sign}=A_1.B_2+(A_1B_1'B_2'+A_1'A_2'B_2)D_1 \quad (9)$$

Referring now to Fig. 11, gates 110, 112, 114 and 116 mechanize Equation 6 to change the state of a flip-flop $D_1$ each time the true result of an arithmetic operation is a plus one, while gates 118, 120, 122 and 124 mechanize Equation 7 to change the state of a flip-flop $D_2$ each time the true result of an arithmetic signal is a minus one. Thus flip-flop $D_1$ serves to remember whether the last true plus one was represented in signal $D_{out}$ as a plus one or zero, while flip-flop $D_2$ functions to remember whether the last true minus one was represented as a zero or minus one.

Equation 8, on the other hand, is represented in Fig. 11 by a plurality of gates 126, 128, 130, 132 and 134, and signifies those conditions under which $D_{out}$ presents a high level output signal representative of one. Gates 130 and 132 are then also used in conjunction with a two terminal "or" gate 136 mechanized in accordance with Equation 9 to indicate by a high level output signal those one-representing signals in train $D_{out}$ which represent a plus positive one, all other one-representative signals in train $D_{out}$ being denoted as minus ones by virtue of a low level voltage in sign train $D_{sign}$.

It will be recognized by those skilled in the servo art that the teachings of the present invention may be amplified in view of known servo technique to provide even more complex digital servos, such as a dual mode servo for example, wherein proportional control is employed only when the positional element is within a predetermined range of the null position and bang-bang control is used when the positionable element is without this range. Still another modification of the invention within the skill of the art would be to operate the positional servo systems of the invention using other forms of trifunction information, as previously described hereinabove. Accordingly, it is to be expressly understood that the invention is intended to encompass all such variations thereof which are within the skill of the art, and that the invention is to be limited only by the spirit and scope of the appended claims.

What is claimed as new is:

1. In a digital position servo for driving a positionable element to a desired position as represented by an applied command signal, the combination comprising: transducer means operable to move said positionable element; a signal generator for generating a position signal representative of the position of said positionable element; means coupled to said signal generator and responsive to said command signal and to said position signal for generating a train of sequential difunction signals representative of the positional error of said positionable element with respect to the desired position, each of said signals having a fixed period T and having either a first value representing a first number or a second value representing a second number, the average of the numbers represented by the signals in the train corresponding to the positional error; and means for applying said control signal train to said transducer, said transducer being responsive to said control signal train for moving said positionable element toward the desired position.

2. In a digital position servo wherein a transducer is selectively energizable to drive a positional element to a predetermined position corresponding to the position represented by an applied command signal, the combination comprising: a signal generator for generating a position signal representative of the position of the positionable element; signal combining means coupled to said signal generator and responsive to said command signal and to said position signal for generating an error signal train of bivalued electrical signals representative of the sense and magnitude of the positional error between the positions represented by said command signal and said position signal, each of said signals having a fixed predetermined period and having either a first value representing a first number, or a second number, the average of the numbers represented by the signals in said train representing the positional error; and means for applying said error signal train to the servo transducer for energizing said transducer to drive the positional element in a restoring direction.

3. The combination defined in claim 2 wherein said first number is a plus one and said second number is a minus one, said transducer being energizable in one direction in response to each signal having said first value and in the opposite direction in response to each signal having said second value whereby the net energization of said transducer corresponds in magnitude and sense to the magnitude and sense of the positional error.

4. The combination defined in claim 2 wherein said last named means includes a digital differentiator responsive to said digital control train for generating a derivative of error signal train consonant with said error signal train and representative of the derivative with respect to time of the positional error represented by said error signal train; and means for applying both of said signal trains to the transducer to control the energization thereof whereby both proportional control and derivative control are employed to reduce the positional error.

5. The combination defined in claim 2 wherein said last-named means includes a digital integrator responsive to said error signal train for generating an integral of error signal train consonant with said error signal train and representative of the integral with respect to time of the positional error represented by said error signal train; and means for applying both of said signal trains to the transducer to control the energization thereof whereby both proportional control and integral control are employed to reduce the positional error.

6. The combination defined in claim 2 wherein said last-named means includes a digital differentiator responsive to said digital control train for generating a derivative of error signal train consonant with said error signal train and representative of the derivative with respect to time of the positional error represented by said error signal train; a digital integrator responsive to said error signal train for generating an integral of error signal train consonant with said error signal train and representative of the integral with respect to time of the positional error represented by said error signal train; and means for applying all three of said signal trains to the transducer to control the energization thereof thereby to provide both proportional and lead-lag control.

7. A digital position servo operable in response to an applied command signal representative of a position for driving a positionable element to the position represented by the command signal, said digital servo comprising: first means coupled to the positionable element for generating a position signal representative of the position of the positionable element; second means coupled to said first means and responsive to the command signal and said position signal for generating a train of difunction signals having a fixed rate of occurrence and non-numerically representative of the sense and magnitude of the positional error between the positions represented by the command signal and said position signal, each signal having either a first value representing a plus one or a second value representing a minus one, the average of the signals in the train representing the sense and magnitude of the positional error; and transducer means coupled to said second means and to the positionable element, said transducer means being responsive to said difunction error signal train for driving the positionable element in a sense to reduce the positional error.

8. A digital position servo operable in response to an applied difunction command signal train non-numerically representative of a position for driving a positionable element to the position represented by the command signal train, said position servo comprising: first means coupled to the positionable element for generating a difunction position signal train consonant with the command signal train and representative of the position of the positionable element; second means coupled to said first means and responsive to the difunction command signal train and said difunction position signal train for generating a difunction error signal train non-numerically representative of the sense and magnitude of the positional error between the positions represented by the command signal and said position signal; and transducer means coupled to said second means and to the positionable element, said transducer means being responsive to said difunction error signal train for driving the positionable element in a sense to reduce the positional error and at a rate proportional to the magnitude of the positional error.

9. A digital position servo operable in response to an applied difunction command signal train representative of a position for driving a positionable element to the position represented by the command signal train, said position servo comprising: an analog-to-difunction converter coupled to the positionable element for generating a difunction position signal train consonant with the command signal train and representative of the position of the positionable element; a difunction subtractor circuit coupled to said converter and responsive to the difunction command signal train and said difunction position signal train for generating a difunction error signal train representative of the sense and magnitude of the difference between the positions represented by the command signal and said position signal; and transducer means coupled to said difunction subtractor circuit and to the positionable element, said transducer means being responsive to said difunction error signal train for driving the positionable element in a sense to reduce the positional error and at a rate proportional to the magnitude of the positional error.

10. A digital position servo operable in response to an applied difunction command signal train representative of a position for driving a positionable element to a position corresponding to the position represented by the input train, each signal in the command train having either a first value representing a first number or a second value representing a second number, the average value of the numbers represented by the signals in the train representing the position, said digital position servo comprising: first means coupled to the positionable element for generating a position signal train consonant with the command signal train and representative of the position of the positionable element; second means coupled to said first means and responsive to the command signal train and said position signal train for generating a difunction control signal train representative of the positional error between the positions represented by the command signal train and said position signal train; and transducer means coupled between said second means and the positionable element; said transducer means being responsive to said control signal train for driving the positionable element toward the position represented by the command signal train.

11. A digital position servo operable in response to an applied difunction command signal train representative of an input position for driving a positionable element to a position corresponding to the input position, said train being composed of a plurality of sequential signals each having the same period and having either a first value representing a first number or a second value representing a second number, the average of the numbers represented by said signals representing the input position, said position servo comprising: transducer means coupled to the positionable element and bidirectionally energizable for driving the positionable element in a direction corresponding to the sense of the net energization of said transducer; an analog-to-digital converter coupled to the positionable element for generating a position signal train consonant with the command signal train and representative of the position of the positionable element; signal combining means coupled to said converter and responsive to the command signal train and said position signal train for generating a difunction error signal train consonant with the command signal train and representative of the positional error between the positions represented by the command signal train and said position signal train; and means for energizing said transducer means in accordance with the signals in said error signal train whereby the positionable element is driven in an error reducing sense and at a rate which is a function of the magnitude of the error.

12. The combination defined in claim 11 wherein said last-named means includes a difunction differentiator responsive to said difunction error signal train for generating a difunction derivative-of-error signal train consonant with the command signal and representative of the derivative with respect to time of the positional error represented by said difunction error signal train, and means coupled to the transducer and responsive to said difunction error signal train and to said difunction derivative of error signal train for energizing said transducer means to drive the positionable element in a sense and at a rate corresponding to the sense and magnitude of the sum of the positional error and the time rate of change of the positional error.

13. The combination defined in claim 11 wherein said last-named means includes a difunction integrator responsive to said difunction error signal train for generating a difunction integral-of-error signal train consonant with said difunction error signal train and representative of the integral with respect to time of the positional error represented by said difunction error signal train, and means coupled to the transducer and responsive to said difunction error train and said difunction integral-of-error signal train for energizing said transducer means to drive the positionable element in a sense and at a rate corresponding to the sense and magnitude of the sum of the positional error and the integral of the positional error with respect to time.

14. The combination defined in claim 11 wherein said last-named means includes a difunction differentiator responsive to said difunction error signal train for generating a difunction derivative of error signal train consonant with the command signal and representative of the derivative with respect to time of the positional error represented by said difunction error signal train; a difunction integrator responsive to said difunction error signal train for generating a difunction integral-of-error signal train consonant with said difunction error signal train and representative of the integral with respect to time of the positional error represented by said difunction error signal train, and means coupled to the transducer and responsive to said difunction error train, said difunction derivative-of-error signal train and said difunction integral-of-error signal train for energizing said transducer means to drive the positionable element in an error reducing sense and at a rate which is a function of the positional error, the time rate of positional error change of the positional error, and the integral of the positional error with respect to time.

15. The combination defined in claim 11 which further includes means for providing derivative-of-error control to said transducer in response to a second applied difunction command signal train consonant with the position-representing difunction command signal train, the second difunction command signal train representing the time rate of change of the position represented by the position-representing command signal train, said means including a difunction quantizer coupled to the positionable element for generating a difunction rate signal train consonant with the command signal train and representative of the time rate of change of the positionable element, means for combining the second difunction command signal and said difunction rate signal train to generate a difunction derivative-of-error signal train representative of the difference between the time rate of change of the position represented by the position-representing command signal and the time rate of change of the positionable element, said transducer energizing means being responsive to said difunction error signal train and said difunction derivative-of-error signal train for energizing said transducer means to drive the positionable element in an error reducing sense and at a rate proportional to the positional error and the time rate of change of the positional error.

16. The combination defined in claim 11 which further includes a difunction quantizer coupled to the positionable element for generating a difunction rate signal train consonant with the command signal train and representative of the time rate of change of the positionable element, and wherein said transducer energizing means is responsive to said difunction error signal train and said difunction rate signal train for energizing said transducer means in an error reducing sense and at a rate proportional to the positional error and the time rate of change of the position of the positionable element.

17. A digital position servo operable in response to an applied command signal representative of a position for driving a positionable element to the position represented by the command signal, said digital servo comprising: first means coupled to the positionable element for generating a position signal representative of the position of the positionable element; second means coupled to said first means and responsive to the command signal and said position signal for generating a train of difunction signals having a fixed rate of occurrence and non-numerically representative of the sense and magnitude of the positional error between the positions represented by the command signal and said position signal, each signal having either a first value representing a first number or a second value representing a second number, the average of the signals in the train representing the magnitude of the positional error; and transducer means coupled to said second means and to the positionable element, said transducer means being responsive to said difunction error signal train for driving the positionable element to reduce the positional error.

18. The digital servo defined in claim 17 wherein said command signal and said position signals are difunction signal trains consonant with said train of signals generated by said second means, and wherein said first number and second number are plus one and minus one, respectively.

19. The digital servo defined in claim 17 wherein said command signal and said position signal are trifunction signal trains and said first and second numbers are one and zero, respectively, and wherein said second means is also responsive to the command signal and said position signal for generating a sign signal train consonant with said train of difunction signals generated by said second means, each signal in said sign signal train having either a first value representing a plus or a second value representing a minus, the sign of each one-representing signal in said train of difunction signals corresponding to the sign represented by the value of the simultaneously appearing sign in said sign signal train.

20. A digital position servo for driving a positionable element to a desired position represented by an applied command signal, the operations of said position servo being synchronized with respect to an applied timing signal of predetermined period T, said position servo comprising: a signal generator coupled to said positionable element for producing a positional signal representative of the position of said positionable element; and means responsive to said command signal, said positional signal and said timing signal for producing in each successive period T error signals representing either a first, second or third number, the average of the numbers represented by said error signals being representative of the positional error between the positions respectively represented by said command and positional signals; and transducer means responsive to said error signals for driving the positionable element to reduce the positional error.

21. A digital position servo for driving a positionable element to a desired position represented by an applied trifunction command signal train synchronized with respect to an applied timing signal of period T, said trifunction command signal train comprising successive signals representing in each period T either a first, second or third number, the value of said command signal train being equal to the average value of the numbers represented by the signals of said command train, said position servo comprising: means coupled to said positionable element for producing a trifunction positional signal train representative of the position of said element; signal combining means responsive to the trifunction command signal train and to said trifunction positional signal train for producing a trifunction error signal train representative of the difference between the positions respectively represented by said command signal train and said positional signal train; and transducer means responsive to said trifunction error signal train for driving the positionable element to reduce the positional error.

22. A digital position servo for positioning a positionable element in accordance with an applied difunction positional command signal, said digital servo comprising: means coupled to said positionable element for producing a difunction feedback signal train representative of the position and rate of change of position of the positionable element; means responsive to said difunction command signal train and to said difunction feedback signal train for producing a difunction error signal train representative of the error in position and the rate of change of position of the positionable element; and transducer means responsive to said difunction error signal train for driving the positionable element to reduce the positional error.

23. A digital position servo for driving a positionable element in accordance with an applied difunction command signal train representative of a desired position and the rate of change of the desired position, said digital servo comprising: means coupled to said positionable element for producing a difunction feedback signal train representative of the position and rate of change of position of the positionable element; means responsive to said command signal train and said feedback signal train for producing a resultant difunction error signal train representative of the error in position and the error in rate of change of position of the positionable element; and transducer means responsive to said difunction error signal train for driving the positionable element to reduce the positional error.

References Cited in the file of this patent

UNITED STATES PATENTS 2,729,773   Steele _____ Jan. 3, 1956

OTHER REFERENCES

"Fundamentals of Servomechanisms," Lauer, Lesnick, Matson, chapter V, p. 114 and p. 119, Figure 5.5.